Nov. 7, 1933.  J. WAHL  1,933,610
COMBINED AIR CHUCK AND GAUGE
Filed Aug. 2, 1930
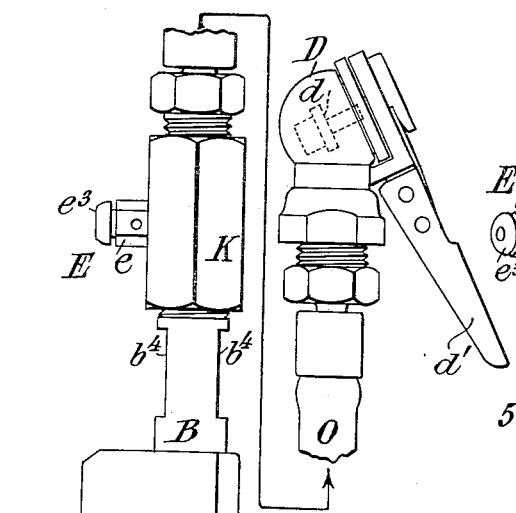
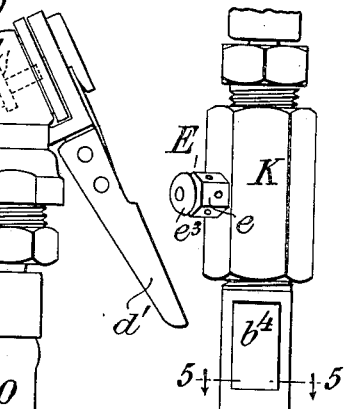
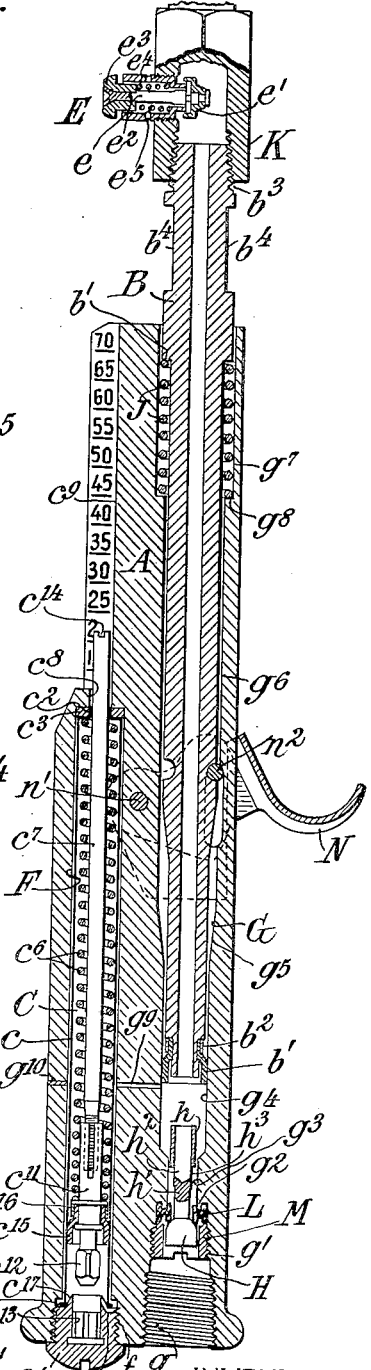
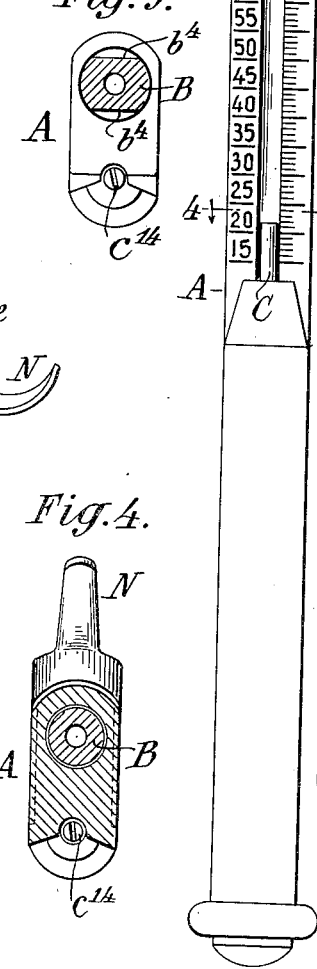
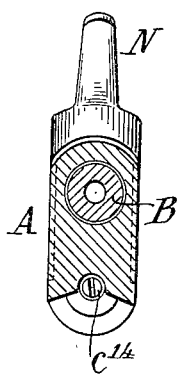
INVENTOR
John Wahl,
By Attorneys,
Fraser, Myers & Manley.

Patented Nov. 7, 1933

1,933,610

UNITED STATES PATENT OFFICE 1,933,610

COMBINED AIR CHUCK AND GAUGE

John Wahl, Rosedale, N. Y., assignor to A. Schrader's Son, Incorporated, Brooklyn, N. Y., a corporation of New York Application August 2, 1930. Serial No. 472,726

2 Claims. (Cl. 152—11.5)

This invention relates to a combined air chuck and gauge adapted for use in inflating pneumatic tires or the like, and provides a structure by means of which tires or other articles can be inflated to the desired pressure in a convenient manner.

According to the present invention I provide a construction in which the tire or other article being inflated, can, at will, be connected either to the source of fluid pressure or to the gauge, the latter at no time being exposed to the fluid pressure from the source or tank. A manually operable deflator means is also provided whereby, should the tire be overinflated, the excess pressure may be vented therefrom without disconnecting the device from the tire or otherwise affecting the operative relationship of the parts. The invention provides a simple and effective method and means for performing these functions while also providing means whereby the gauge is vented to atmosphere, so that the gauge is automatically restored to zero position ready for the next gauging operation. The invention also includes certain other features of novelty which are hereinafter pointed out.

A preferred embodiment of my invention is shown in the accompanying drawing, wherein Figure 1 is a side elevation of the device.

Fig. 2 is a top plan view of the device, the air chuck being omitted.

Fig. 3 is a longitudinal section taken substantially along the plane of the line 3—3 of Fig. 2.

Fig. 4 is a transverse section taken substantially along the plane of the line 4—4 of Fig. 1.

Fig. 5 is a transverse section taken substantially along the plane of the line 5—5 of Fig. 2.

Referring to the drawing, the device, which is preferably in the nature of a portable instrument, comprises an elongate body member A having a coupling member or stem B, a pressure gauge C, an inflating chuck D and a deflating means E, said parts being operatively connected together in the novel manner hereinafter described.

The body member A is preferably of oblong cross-section and is formed with bores F and G extending longitudinally therethrough. The bore F houses the pressure gauge C, the details of which will be presently described. The bore G is of various diameters and accommodates the stem B which is slidable therein, and a valve H which controls the passage of fluid through said bore. The bore G at its rear end is enlarged and internally threaded, as shown at $g$, said thread being adapted for connection with a hose fitting (not shown) leading to the source of fluid pressure. Inwardly of said bore $g$ is a bore of somewhat reduced diameter $g'$ which terminates in a shoulder $g^2$ provided between said bore $g'$ and a bore of smaller diameter $g^3$. Further inwardly from the bore $g^3$ the bore G is again enlarged, as shown at $g^4$, and then tapers outwardly, as shown at $g^5$ to provide the bore portion $g^6$ of somewhat larger diameter. The latter bore is again enlarged, as shown at $g^7$, and extends to the forward end of the body member and provides a shoulder $g^8$ with the bore $g^6$. A duct $g^9$ establishes communication between the bore F and the portion $g^4$ of the bore G, said duct being provided by a drilling operation from the exterior of the body portion, the outer portion of said drilled hole being sealed with a plug $g^{10}$.

The stem B, which is hollow, is mounted for limited sliding movement within the bore G and is normally held in the position shown in Fig. 3 through the medium of a spring J, one end of which bears against the shoulder $g^8$ and the other end against a shoulder $b^1$ on the stem. The stem at its inner end is reduced in diameter and has mounted thereon a plunger cup $b'$ which is held in clamping relation on the stem by a ferrule $b^2$. The plunger cup $b'$ provides a packed fit with the bore portion $g^4$, and in the normal position of the stem B uncovers the duct $g^9$. The end of the stem B, which normally projects outwardly beyond the body portion A, is externally threaded, as shown at $b^3$, and has connected thereto a union K in which the deflating means E is mounted. To insure a tight connection between the union K and the stem G, the latter is formed with flat wrench-engaging surfaces $b^4$.

Mounted on the shoulder $g^2$ is a packing washer L which is held in position by an externally threaded nipple M engaging in the screw-threaded bore $g'$. The valve H has an enlarged inner end $h$ and a reduced intermediate stem $h'$ and is normally held seated upon the packing L by the fluid pressure from the source or tank. When unseated by the stem B, it is guided within the bore $g^3$ by the inner end $h$ which is counterbored, as shown at $h^2$, and has its faces shaved off, as shown at $h^3$, to permit the passage of the pressure fluid therethrough.

As a practicable and convenient means for moving the stem B against the action of the spring J, I provide a trigger N, which, as herein shown, is formed from a sheet metal stamping, having upwardly-extending arms $n$ which straddle the sides of the body member A to which they are pivoted, by means of a pin $n'$. To provide a construction free from obstructions, the faces of the body portion A are grooved or depressed, as shown at $a$, to a depth such that the upwardly bent arms $n$ of the trigger member will lie flush with the outer surfaces of the body portion A. Carried by the stem B is a transverse pin $n^2$ which projects through elongate slots $a'$ in the opposite sides of the body member and through openings $n^3$ in the opposite arms $n'$ of the trigger, the ends of said pin being upset over the outer faces of the arms of the trigger to prevent the separation of the members. The openings $n^3$ are slightly larger in diameter than the pin $n^2$ so as to allow for the pivotal action of the trigger.

The gauge device C comprises a cylindrical tube $c$, one end of which is flared outwardly as shown at $c'$, and the other end of which is turned inwardly and then axially outwardly, as shown at $c^2$, said end $c^2$ being held in leak-tight engagement with a packing washer $c^3$ in the inner end of bore F through the medium of a locking screw $c^4$ which is threaded into the internally screw-threaded end $f$ of the bore F. The sleeve $c$, which constitutes the gauge cylinder, has an outer diameter slightly less than that of the bore F to provide an air passage which communicates with the duct $g^9$. To permit the passage of fluid from the space around the cylinder $c$ into the cylinder, the inner end of the locking screw $c^4$ is grooved, as indicated at $c^5$. The gauge comprises a piston, a spring $c^6$ for resisting outward movement of the piston under fluid pressure, and an indicating member $c^7$ which is projectable through an opening $c^8$ in the body member leading from the bore F. In alignment with the bore $c^8$ is a groove $c^9$ in the top face of the body member, which groove is flanked by oppositely inclined, flat faces $c^{10}$ upon which pressure indicia are provided. It is desirable that the gauge be of a construction which will permit of the adjustment thereof so as to accurately set the zero point thereon after the gauge parts are assembled. To accomplish this the indicating member $c^7$ may be said to consist of two parts which are screw-threadedly connected together so that the effective length of the member may be varied. As herein shown, the inner part of the indicating member is in the form of a split sleeve $c^{11}$ which is internally screw-threaded for cooperation with the externally screw-threaded end of the part $c^7$, the split sleeve serving as a resilient means for holding the threaded parts in set relation. To vary the effective length of the indicating member after the gauge parts are assembled, it will be appreciated that one of the screw-threaded members will have to be held stationary while the other is rotated. This I accomplish by providing the inner end of the member $c^{11}$ with a squared stud $c^{12}$ and forming the locking screw $c^4$ with an internally squared cavity $c^{13}$ adapted to receive the end $c^{12}$ and hold it against rotation while the part $c^7$ is rotated. To rotate the part $c^7$, the outer end thereof is provided with a kerf $c^{14}$ for engagement with a screw driver or the like. The gauge piston is formed by a cupped packing $c^{15}$ which is held between a pair of ribs on the member $c^{11}$ by a ferrule $c^{16}$. For insuring effective engagement between the packing $c^{15}$ and the inner wall of the tube $c$, said packing is normally forced over an expanding cone $c^{17}$ formed on the inner end of the locking screw $c^4$.

The deflator means E is in the form of a spring-seated valve which is manually unseatable and comprises a tubular element $e$ which is screw-threaded into an opening in the union K, the inner end of said tube $e$ constituting a valve seat, against which is held a valve $e'$ having a stem $e^2$ and an enlarged head $e^3$, the valve being held against its seat by a coil spring $e^4$ positioned between a shoulder on the interior of the tube $e$ and the enlarged head $e^3$. To permit egress of the air from the tube when the valve is unseated, openings $e^5$ are provided in the wall of the tube above the union K. It will be apparent that upon pressing inwardly on the head $e^3$ of the valve stem the valve will be unseated to vent fluid from the interior of the union.

The device is primarily intended for inflating and gauging pneumatic tires, and for this purpose there is provided an air chuck for engagement with the nipple end of a tire valve stem. This air chuck may be of any preferred construction and may be either rigidly connected to the union K or flexibly connected thereto by a length of hose O, as herein shown. The connection between the hose and the union, and between the hose and the air chuck may be of any preferred form. The air chuck D as herein shown is of a quick-detachable type, which forms the subject-matter of a pending application, and suffice to say that it comprises means for quickly attaching and detaching it to the end of a tire valve stem when the arm $d'$ thereof is gripped, and comprises a deflating pin $d$ for engaging and holding the tire valve unseated.

In use at service stations or the like the combined air chuck and gauge of the present device will be attached to a hose leading from the air compressor or tank and will be supported upon a suitable hook. The tank pressure will normally seat the valve H, hence no air will pass through the device. When the air chuck D is connected to a tire valve, communication is established between the interior of the tire and the pressure gauge through the hollow stem B, duct $g^9$, the space about the cylinder $c$ and groove $c^5$. The air pressure in the tire will thereupon be indicated by the gauge. If the indicated pressure is too low, the operator holding the device in his hand will pull on the trigger N, whereupon the stem B will be moved inwardly, the inner end thereof unseating the valve H and sealing the portion of the bore $g^4$. Air from the tank will then enter the tire, the gauge plunger will be returned to its zero position, the air from the interior of the gauge passing outwardly through the duct $g^9$ around the exterior of the stem B to the atmosphere. When it is thought that sufficient air has been admitted, the trigger is released, whereupon the valve H closes and communication is again established between the tire and the gauge, which will indicate the pressure. Should this now be found to be too great, the pressure in the tire may be relieved by pressing upon the head $e^3$ of the deflator, which will vent air from the tire, and this venting continued until the desired pressure is obtained as shown by the gauge, the indicator of which will recede as the air is being vented. The inflating operation being completed, the device is returned to its supporting hook.

From the foregoing it will be appreciated that I have provided a simple and compact device for accomplishing the various objects of the invention as set forth in the opening statement of the specification. It will be further appreciated that the device is sturdy, compact and simple in construction with no part subject to becoming disorganized in use, and such that replacement of any part, should the same become necessary, can be readily made.

While I have shown and described a preferred embodiment of my invention it is to be understood that I do not wish to be limited to the details of construction set forth, as changes therein may be made within the scope of the appended claims without departing from the spirit of the invention.

What I claim is:

1. A device of the character described, comprising a casing having a bore adapted for connection with a source of fluid pressure, a valve in said bore seating under fluid pressure from the source, a pressure gauge, a hollow stem having a packed sliding fit in one portion of said bore, and at another portion of said bore providing therewith a passage for fluid to the atmosphere, said hollow stem being movable in said bore to unseat the valve, said casing having a duct leading from the gauge to the bore and traversable by the packed portion of the hollow stem, spring means normally holding said stem out of valve unseating position and the packed portion of the stem in a position establishing communication between the gauge and the interior of the hollow stem, and means for moving the hollow stem against the force of the spring means for unseating the valve, closing communication between the duct and the interior of the hollow stem and establishing communication between the duct and the atmosphere.

2. A combined inflating chuck and gauge, comprising an elongate casing having a bore extending longitudinally thereof adapted for communication with a source of fluid pressure and having therein a valve normally seating under fluid pressure from the source, a duct leading from said bore for establishing fluid communication between the said bore and the gauge, a hollow stem having a packed sliding fit in the portion of said bore provided with the duct leading to the gauge and at another portion of said bore providing therewith a passage for fluid to the atmosphere, said hollow stem being movable in said bore to unseat the valve and traverse said duct, spring means normally holding said stem out of valve unseating position and establishing communication through the duct between the gauge and the interior of the hollow stem, and means for moving the hollow stem against the force of the spring means for performing the following functions: (1) closing communication between the duct and the interior of the hollow stem; (2) establishing communication between the duct and the atmosphere through the passage between the hollow stem and the bore; and (3) unseating the normally seated valve.

JOHN WAHL.